United States Patent [19]

Zhang

[11] Patent Number: 5,359,430
[45] Date of Patent: Oct. 25, 1994

[54] BLOCK-HALFTONING METHOD AND SYSTEM WITH COMPRESSED ERROR IMAGE

[75] Inventor: Shenzhi Zhang, Issaquah, Wash.

[73] Assignee: Microsoft Corporation, Redmond, Wash.

[21] Appl. No.: 883,546

[22] Filed: May 15, 1992

[51] Int. Cl.$^5$ .................. H04N 1/41; H04N 1/415; H04N 1/40
[52] U.S. Cl. .................................. 358/455; 358/456; 358/429; 358/433; 358/457; 358/465; 358/466
[58] Field of Search ............... 358/432, 433, 426, 427, 358/429, 456, 445, 447, 458, 457, 463, 465, 466

[56] References Cited

U.S. PATENT DOCUMENTS

| | | | |
|---|---|---|---|
| 4,763,279 | 8/1988 | Kellam et al. | 364/518 |
| 4,920,501 | 4/1990 | Sullivan et al. | 364/518 |
| 4,922,273 | 5/1990 | Yonekawa et al. | 358/429 |
| 4,955,065 | 9/1990 | Ulichney | 382/50 |
| 4,965,677 | 10/1990 | Pennebaker et al. | 358/429 |
| 4,982,293 | 1/1991 | Ishii | 358/429 |
| 4,984,097 | 1/1991 | Shu | 358/429 |
| 5,003,496 | 3/1991 | Hunt, Jr. et al. | 364/521 |
| 5,027,078 | 6/1991 | Fan | 358/456 |
| 5,285,291 | 2/1994 | Schiller | 358/455 |

OTHER PUBLICATIONS

Ulichney, R., "Digital Halftoning," The MIT Press, Cambridge, Mass., 77–99, 1987.

Primary Examiner—Edward L. Coles, Sr.
Assistant Examiner—Kimberly A. Williams
Attorney, Agent, or Firm—Seed and Berry

[57] ABSTRACT

A digital image processing system for convening continuous-tone images into halftone images to be output by a receiver with limited storage capacity. The continuous-tone image is converted into a first halftone image by threshold screening. Threshold screening involves comparing the pixel values of blocks of the continuous-tone image with cell values of a threshold array and turning on pixels of a first halftone image according to whether the pixel values of the continuous-tone block are greater than or equal to the cell values of the threshold array. The threshold array is associated with a plurality of gray patterns. A block count is determined which equals the number of pixels of each block of the first halftone image that are tuned on. A second halftone image is produced by combining gray patterns corresponding to the block counts. An error image is produced by determining differences between the first halftone image and the second halftone image. Scattered pixels in the error image are removed. The error image is compressed and sent to the receiver along with the block counts. The receiver produces a final output halftone image by reversing the process that was used to create the error image.

29 Claims, 8 Drawing Sheets

|    |    |    |    |
|----|----|----|----|
| 1  | 5  | 9  | 4  |
| 11 | 13 | 16 | 8  |
| 7  | 15 | 14 | 12 |
| 3  | 10 | 6  | 2  |
48 → (upper left), 46 → (right side)
*Fig. 3*
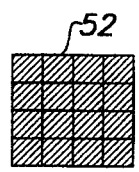 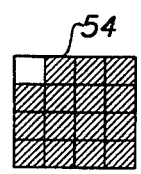 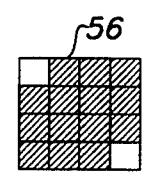 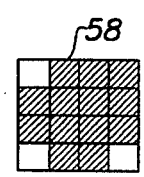 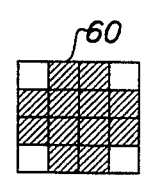
*Fig. 4a*  *Fig. 4b*  *Fig. 4c*  *Fig. 4d*  *Fig. 4e*
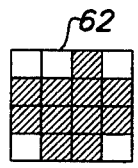 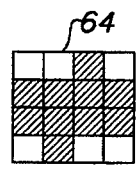 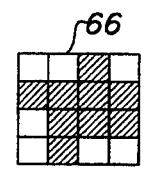 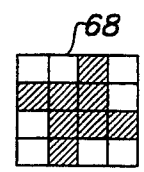 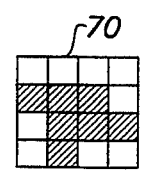
*Fig. 4f*  *Fig. 4g*  *Fig. 4h*  *Fig. 4i*  *Fig. 4j*
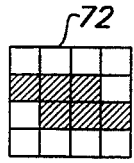 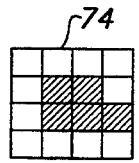 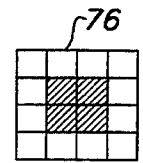 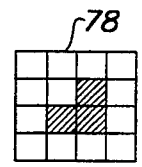 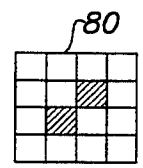
*Fig. 4k*  *Fig. 4l*  *Fig. 4m*  *Fig. 4n*  *Fig. 4o*
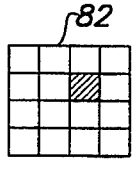 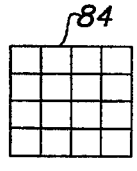
*Fig. 4p*  *Fig. 4q*

BLOCK-HALFTONING METHOD AND SYSTEM WITH COMPRESSED ERROR IMAGE

TECHNICAL FIELD

This invention relates to digital image processing and, more particularly, to block-halftoning of a continuous-tone image.

BACKGROUND OF THE INVENTION

A problem in digital image processing is the vast amount of data, expressed in binary digits or "bits," which are used to describe a digital image. Digital images are defined in terms of picture elements, or "pixels," with each pixel being the smallest unit of an image which the data processing system can process and display. Depending on the size of the image and the resolution, a low-resolution, two-dimensional, rectangular image may have as few as several tens or a hundred pixels on a side, and some high-resolution images have as many as a thousand or more pixels on a side.

Depending on a number of factors, each pixel may also have as many as eight, sixteen or more bits of data in a "continuous-tone" image. In a monochrome image, the data associated with each pixel typically identifies a "luminance" level, which is a measure of the brightness of the pixel. In a color image, the data may also identify various color components and their relative brightness in the pixel. For example, in some monochrome displays, each pixel may be black (a low luminance level) or white (a high luminance level), or it may have these plus a number of intermediate, or "gray," brightness levels. The luminance of a pixel is typically expressed as a binary encoded value, such that if, for example, eight bits are used to encode each pixel, the luminance of the pixel may have up to two hundred fifty-six (that is, $2^8$) different gray levels, including the black and white extremes. If the image has several colors, bits must also be used to identify the color, and, perhaps, the relative brightness level of each color in the pixel.

While an image may be defined in terms of its "continuous-tone" image values, in which each pixel is defined by eight or more bits of data, display devices such as video display terminals and printers normally can only accommodate one or at most a few bits of data for each pixel to define the luminance of the displayed pixel. Images in which a pixel's luminance is defined by one bit per pixel are termed "halftone" images, while, more generally, images in which the pixel luminance is defined by one or only a few bits of data (but fewer bits than are required for the continuous tone image) are termed "dithered" images. The continuous tone image data is processed to generate the output luminance values of the pixels ("pixel values") to define the halftone or dithered image for the display device.

SUMMARY OF THE INVENTION

The invention is directed to a method of processing a continuous tone image having one or more blocks of a plurality of pixels, each pixel being associated with a luminance level. The method includes the steps of performing threshold screening. Threshold screening involves comparing the luminance levels of the pixels of a block of the continuous tone image with a predetermined threshold array of cell values. The block of pixels of the continuous tone image is transformed into a halftone block of pixels, each pixel being turned on or off based on the results of the comparing step. A block count is determined by counting the number of pixels turned on in the halftone block. The block count corresponds to a predetermined gray pattern block. The block count is stored in memory. Threshold screening is continued until all blocks of the continuous tone image have been transformed to halftone block, thereby forming a first halftone image composed of halftone blocks. A second halftone image is formed from the gray pattern blocks corresponding to the index counts stored. An error image is formed by determining the difference between the second halftone image and the first halftone image. Preferably, this is done by exclusive-ORing the halftone image to turn on pixels of the error image whenever corresponding pixels in the halftone images differ from each other.

A preferred embodiment removes all random dots produced in the error image. This is done by counting the number of pixels within a window of a predetermined size. If the number of pixels turned on in the window is less than a predetermined threshold level, then all pixels in the window are turned off. The error image is compressed and sent to a receiver along with the stored block counts.

At the receiver, the compressed error image is decompressed to obtain the error image. The second halftone image is reproduced using the block counts. A final image is produced by exclusive-ORing the second halftone image with the error image.

BRIEF DESCRIPTION OF THE DRAWINGS

FIG. 3 shows an exemplary threshold array used in the present invention.

FIG. 4 shows a set of gray patterns corresponding to the threshold array as used in the present invention.

DETAILED DESCRIPTION OF THE INVENTION

Figure 1:
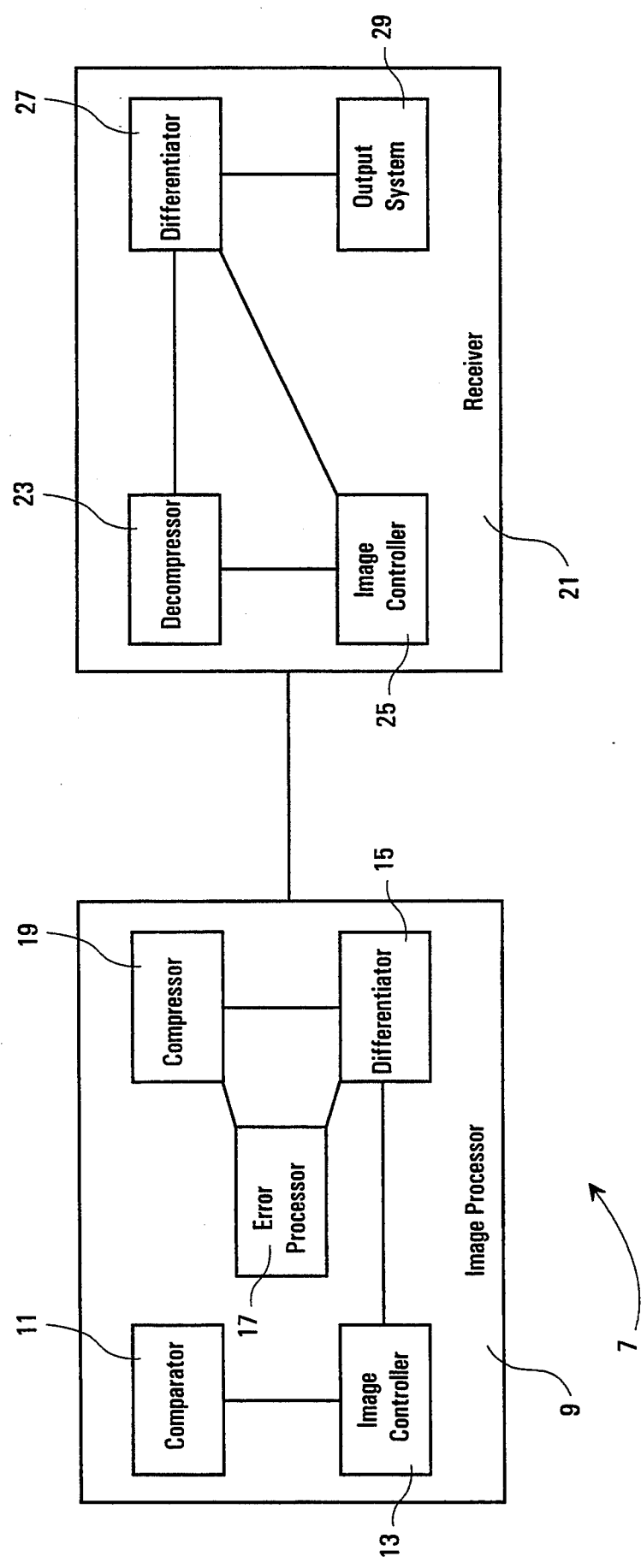
FIG. 1 is a block diagram of the block-halftoning system of the present invention.

FIG. 1 is a block diagram of the block-halftoning system 7 of the present invention. The block-halftoning system includes an image processor 9 that converts a continuous-tone image into a compressed error image. The image processor includes a comparator 11 that performs threshold screening on the continuous tone image to create a first halftone image. An image controller 13 forms a second halftone image and creates the error image. An error processor 17 removes scattered pixels from the error image. A compressor 19 compresses the error image using well-known compression techniques. The image processor 9 sends to a receiver 21 the compressed error image and the data used to create the second halftone image.

Figure 2A:
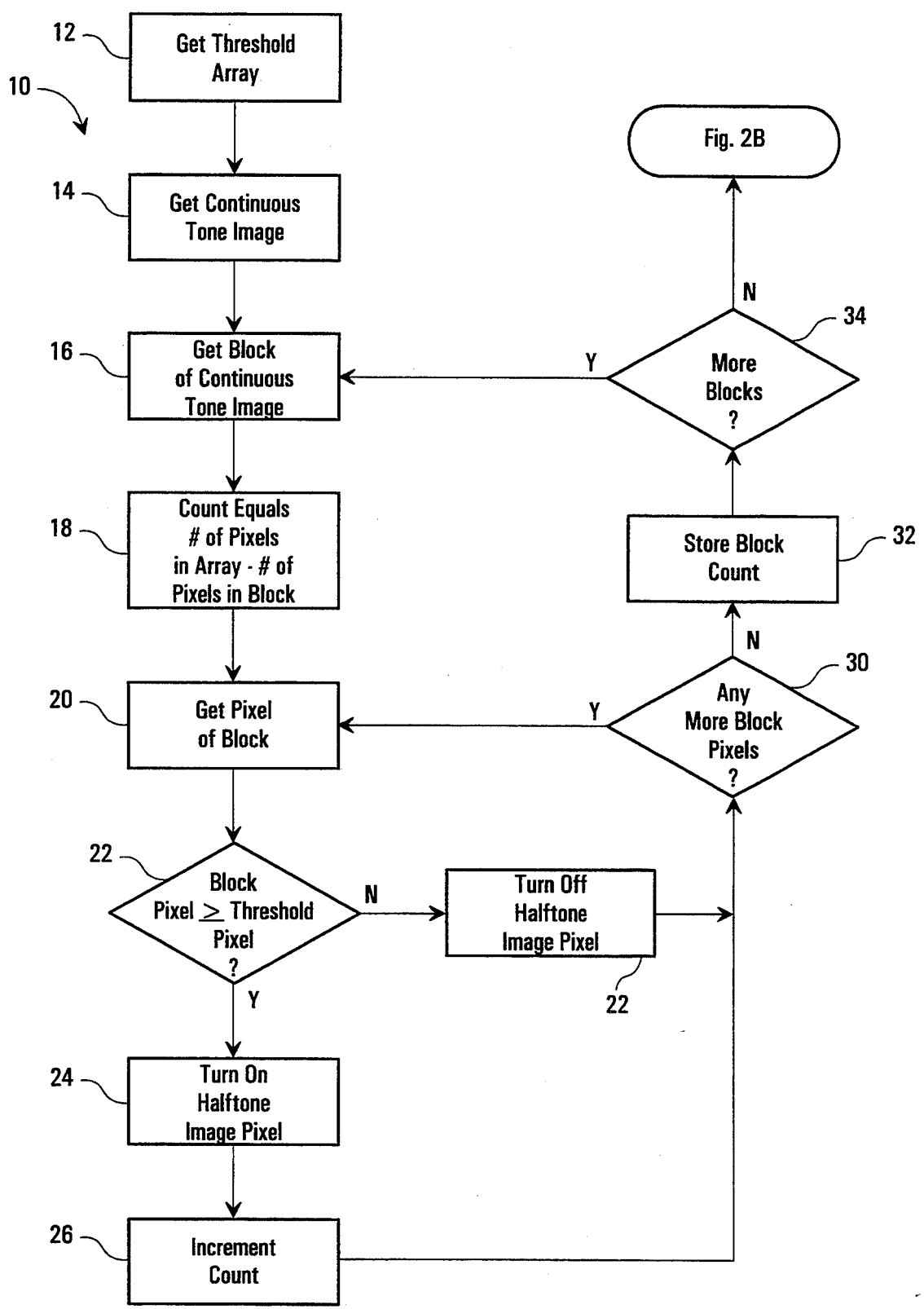
FIGS. 2A and 2B are flowcharts of a block-halftoning method used to create a compressed error image according to the present invention.
Figure 2B:
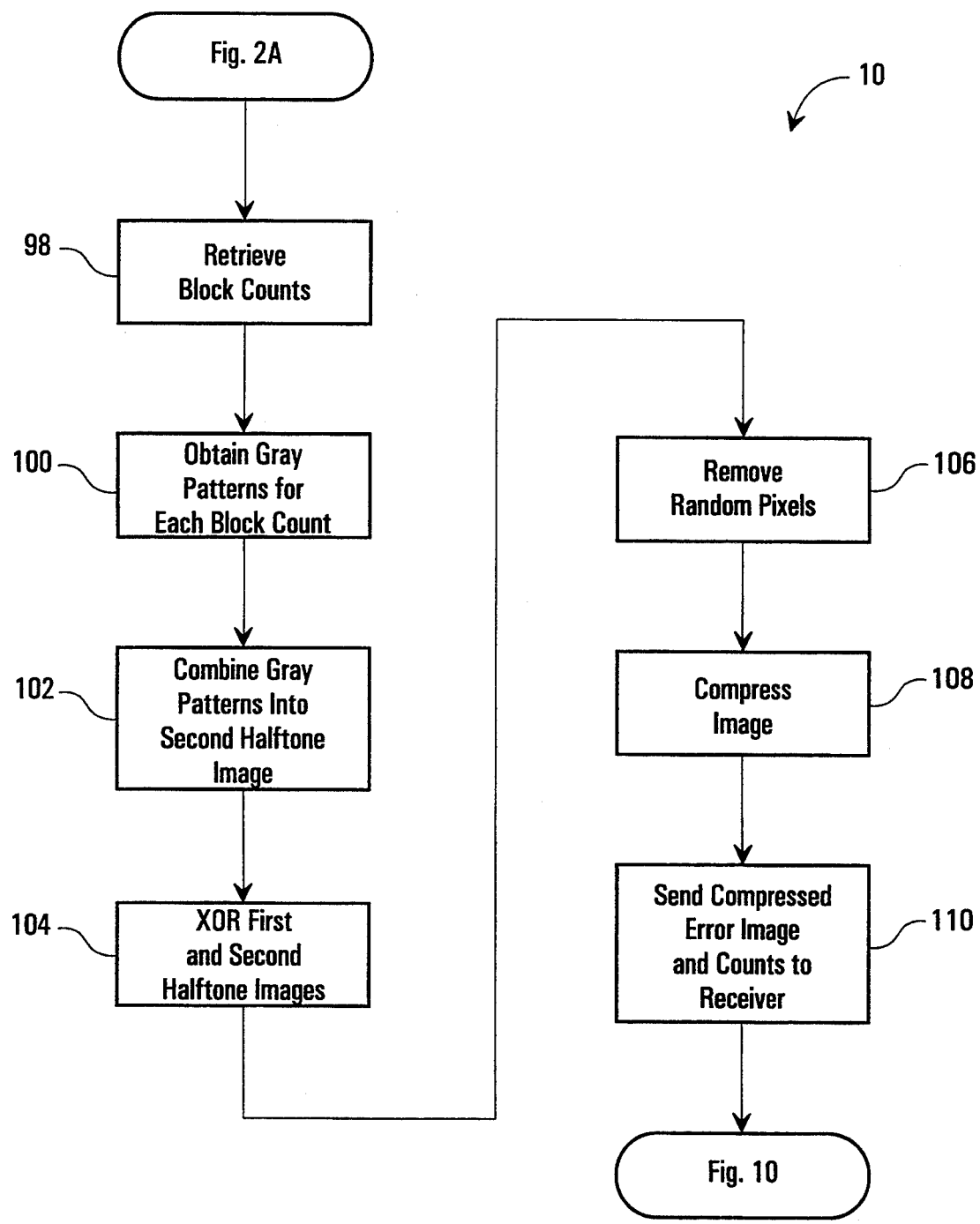

FIGS. 2A and 2B are a flowchart 10 of the block-halftoning method used by the image processor 9 to produce a compressed error image according to the present invention. A first step 12 of the method is to get a threshold array. An example of a threshold array 46 is shown in FIG. 3. The threshold array consists of sixteen cells arranged in a 4×4 array. Although a 4×4 array is shown in FIG. 3, other sized arrays, such as 8×8 or 16×16 arrays may be used instead. Each cell has an illumination value (cell value) ranging from 1 to 16, with 1 being the darkest gray level (black) and 16 being the brightest gray level (white).

In addition to changing the number of cells in the threshold array 46, the pattern of the cells may also be varied. For example, the pattern shown in FIG. 3 shows the smaller cell values around the periphery of the array, while the larger values are in the middle. The pattern may be reversed to have the larger values around the periphery and the smaller values in the middle or the pattern may be any random pattern.

The threshold array 46 defines a set 50 of gray patterns shown in FIG. 4. Each gray pattern 52-84 of the set 50 is a 4×4 array having a unique number of pixels illuminated. The gray patterns range from gray pattern 52 with all pixels turned off (black) to gray pattern 84 with all pixels turned on (white). Each successive gray pattern in the set 50 has an additional pixel turned on according to the order of illumination values in the threshold array 46. For example, gray pattern 54 has its upper left pixel turned on, which corresponds to the cell of the threshold array having a luminance value of 1. Gray pattern 56 has its upper left and lower right pixels turned on, which correspond to the cells of the threshold array having luminance values 1 and 2.

Figure 5:
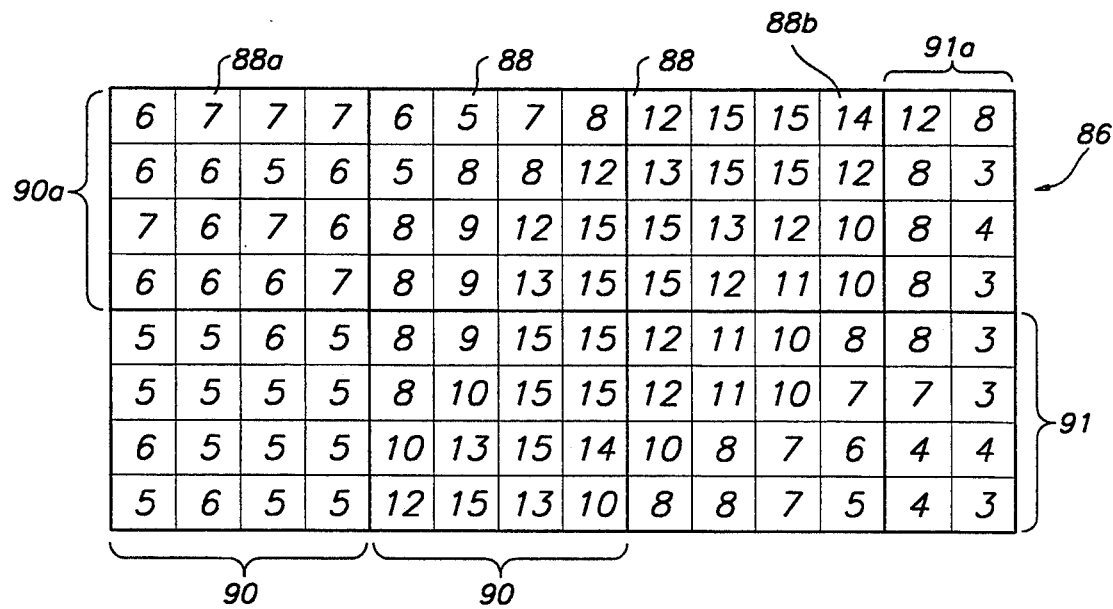
FIG. 5 shows an exemplary continuous tone image used in the present invention.

A next step 14 of the block-halftoning flowchart 10 shown in FIG. 2A is to get a continuous-tone image. FIG. 5 shows an example of a continuous tone image 86. The image 86 is an array of pixels 88 organized into a plurality of array blocks 90, 91. Associated with each pixel 88 is a luminance value (pixel value) which is a measure of the brightness of the pixel. In this example, the array blocks 90 are sized to correspond to the size of the 4×4 threshold array 46. Given the 14×8 array of the continuous-tone image 86, there are six 4×4 array blocks 90 possible and two 2×4 array blocks 91. As discussed in more detail below, the 2×4 array blocks are processed as if they were 4×4 array blocks.

According to the present invention, the processing of the continuous-tone image 86 occurs block by block. The first step 16 is to retrieve one or the array blocks 90, 91 to be processed (for example, the first array block 90a in the upper left corner of FIG. 4). A block count for each block 90 is initialized in step 18. Normally, initialization simply sets the block count equal to zero, but a different value may be used to bias the method to produce a lighter or darker halftone image. In this example, a single pixel 88a from the first array block 90a is compared in step 22 with a corresponding cell 48 in the threshold array 46. If the pixel value of the pixel 88a is greater than or equal to the cell value of the threshold cell 48, then a first halftone image 92 illustrated in FIG. 5 has a corresponding halftone image pixel 94a which is turned on in step 24. The block count is incremented in step 26 and a check is made in step 30 to determine if there are any more pixels within the block 90 to be processed. If the pixel value is less than the cell value, then the corresponding halftone image pixel 94a is turned off in step 28. Steps 20 through 30 are repeated until each pixel of the array block 90a is compared to a corresponding cell of the threshold array 46. A count value for the array block 90a is stored in memory in step 32 and a check is made for further array blocks 90 to be processed in step 34. Steps 16 through 34 are repeated until all array blocks 90, 91 of the continuous-tone image 86 are processed. This processing is known as threshold screening and is performed by the comparator 11.

The method described above employs array blocks 90, 91 that are smaller than or equal to the size of the threshold array 46. One alternate embodiment employs an array block that is larger than the threshold array. For example, the array block is defined as the 4×8 array consisting of the first four columns of the continuous-tone image 86. Instead of comparing each pixel value with a corresponding cell value of the threshold array, two pixel values are compared to a single cell value. In particular, the pixel values of two rows of each column in the continuous-tone image array are compared to a single cell value of the threshold array. It will be appreciated that compensation should be made for the two to one comparison, such as by doubling the cell values.

Figure 6:
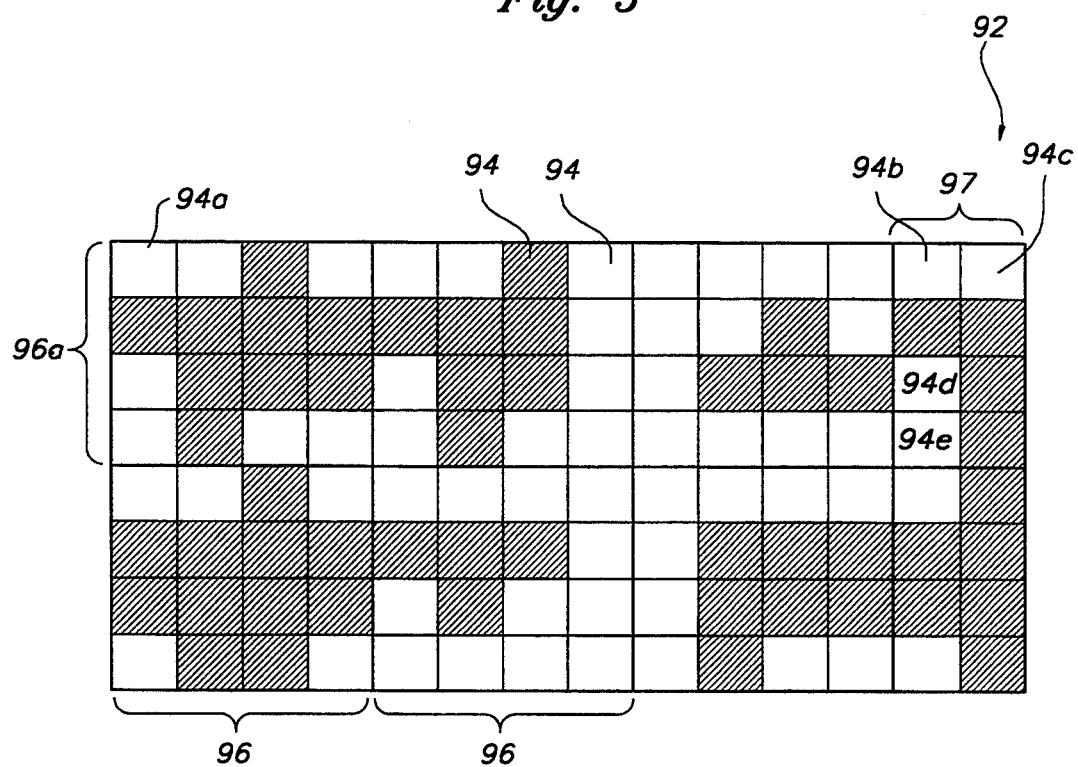
FIG. 6 shows a first halftone image resulting from a comparison of the continuous tone image with the threshold array according to the present invention.

The result of the threshold screening is the first halftone image 92 illustrated in FIG. 6. The first halftone image 92 is an array of halftone image pixels 94 grouped into a plurality of array blocks 96, 97. The array blocks 96 are sized to equal in size the 4×4 threshold array 46, while the array blocks 97 are sized as 2×4 arrays.

Figure 7:
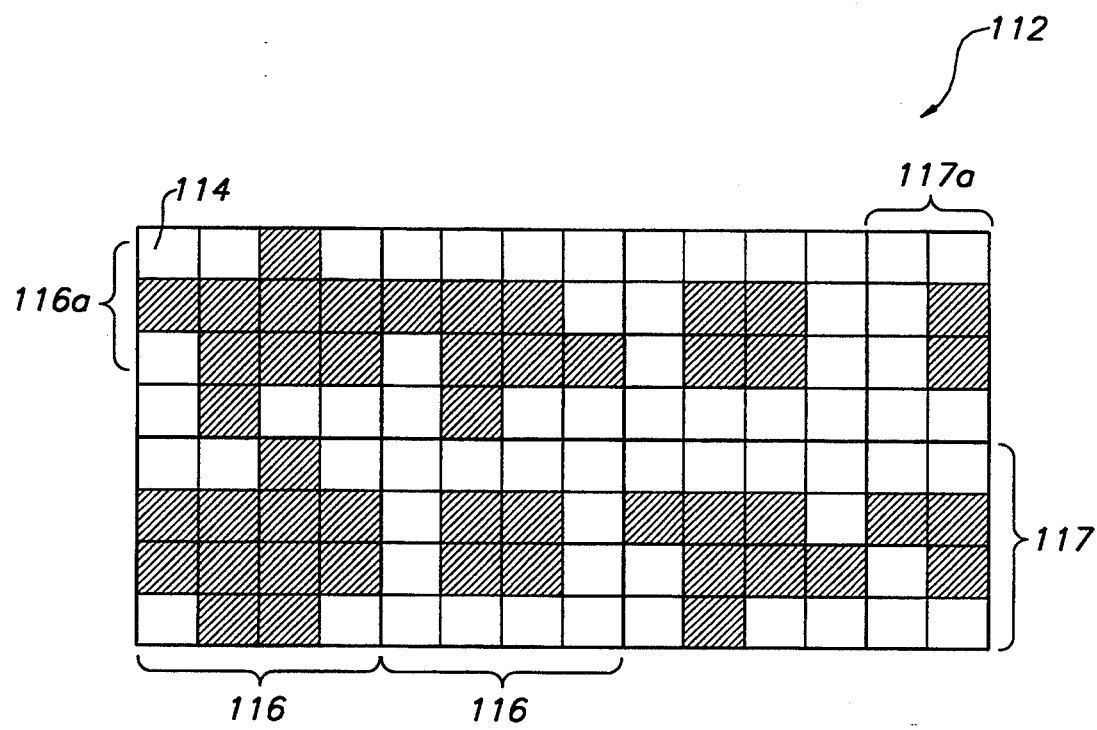
FIG. 7 is a second halftone image composed of threshold gray pattern blocks as used in the present invention.

Referring now to FIG. 2B, the count value for each of the blocks 90, 91 is retrieved in step 98 by the image controller 13. The image controller obtains a gray pattern from the set 50 corresponding to each block count in step 100. The gray pattern corresponding to a block count X has X pixels turned on. For example, for a block count of 7, gray pattern 66 with seven pixels turned on is retrieved. Once the gray pattern for each block is obtained, the image controller combines the gray patterns into a second halftone image 112 in step 102. FIG. 7 shows the second halftone image 112 which is a 14×8 array of pixels 114. The pixels 114 are arranged into a plurality of array blocks 116, 117 equal in size to the array blocks 96, 97 of the first halftone image 92.

Since the continuous-tone image 86 of FIG. 5 is a 14×8 array, it can be divided into six 4×4 array blocks 90 and two 2×4 array blocks 91. The processing of the 2×4 array blocks 91 is generally the same processing used for the 4×4 array blocks 90. However, preferably, compensation is made to make the image 86 block-aligned. This can be done by padding the 2×4 array blocks with two artificial columns of luminance values. The luminance values can be all zeros to bias the array blocks toward a black image, all sixteens to bias the array towards a white image, or some arbitrary values between 0 and 16. The artificial columns are added simply for comparison with the threshold array; the columns do not become part of the halftone images 92, 112.

Using artificial columns of white pixels (luminance values of 16), the first 2×4 array block 99a is processed similar to the 4×4 blocks. The first pixel 86b in the first array block 99a contains a luminance value of 12. Since 12 is greater than the 1 in the upper left corner of the threshold array 46, the corresponding pixel 94b in the first array block 97, in the upper right corner of FIG. 6, of the first halftone image 92 is turned on. Continuing in this manner of comparing the first array block 99a with the two left columns of the threshold array 46 results in a pattern shown in the first array block 97 in the upper right corner of FIG. 6 of first halftone image 92. Four of the pixels 94b-e are turned on, so the block count is incremented four times in step 26. Since the luminance values of the artificial columns are all 16, a comparison with the two right columns of the threshold array 46 results in all pixel values of the artificial columns being greater than or equal to the corresponding cell values. Although there are no pixels to turn on in the first halftone image 92 for the artificial columns, the block count is incremented 8 times for a total block count of 12. It will be appreciated that in actuality, no actual comparison need be done, and the block count can simply be incremented by eight.

To obtain the gray pattern for the first array block 117a in the upper right corner of FIG. 7 from the second halftone image 112, the stored block count of 12 is retrieved in step 98. Gray pattern 76 from FIG. 4 contains 12 pixels turned on so this gray pattern is retrieved for the first array block 117a. Since the first array block 117a is only a 2×4 array while the gray pattern is a 4×4 array, only the two left columns of the gray pattern 76 are incorporated into the second halftone image 112. The gray patterns obtained in step 100 are combined into the second halftone image 112 in step 102.

Figure 8:
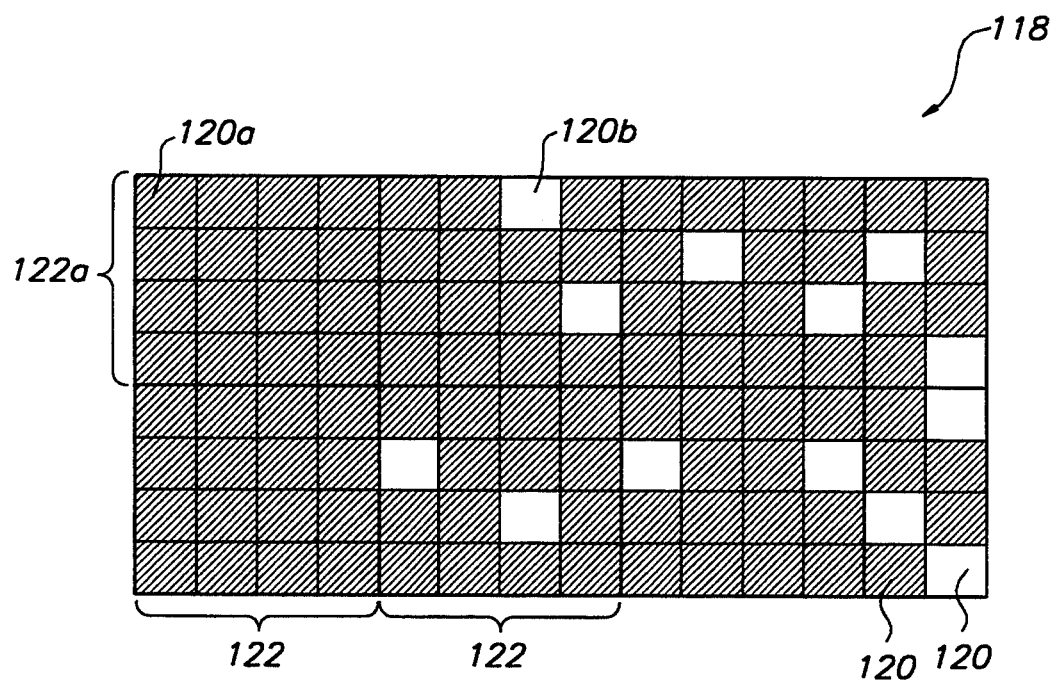
FIG. 8 is an error image showing the difference between the first halftone image and the second halftone image according to the present invention.

The next step in the block-halftoning flowchart 10 shown in FIGS. 2A and 2B is to obtain the difference between the first and second halftone images 92 and 112 using the differentiator 15. This is done in step 104 by exclusive-ORing the halftone images to obtain an error image 118 shown in FIG. 8. Since the first and second halftone images in this example a most of the pixels in the error image 118 are turned off, e.g., black pixel 120a. The pixels 120 are turned on, e.g., white pixel 120b, only when the corresponding pixels in the first and second halftone images differ from each other.

Figure 9:
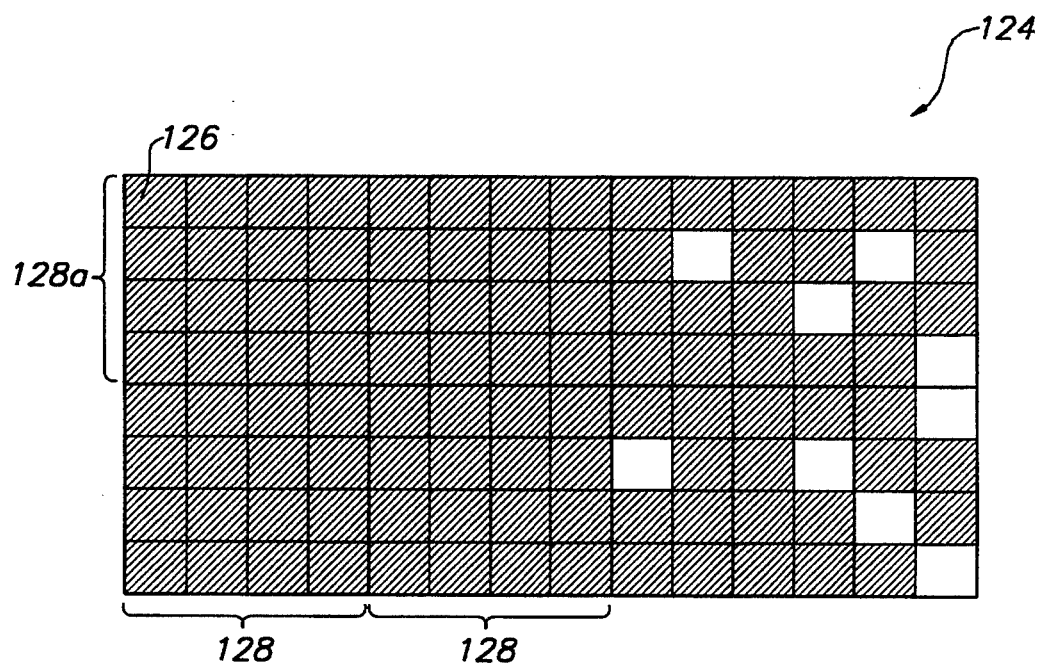
FIG. 9 is a justified error image with random dots removed according to the present invention.

As is usually the case, some of the white pixels in the error image 118 are clustered together, while others are more randomly scattered. White pixels that are randomly scattered in the error image are less significant in terms of the quality of the image produced so the scattered white pixels may be removed without a substantial loss in image quality. This is accomplished in step 106 of FIG. 2B by the error processor 17 depicted in FIG. 1. A simple method to remove scattered white pixels is to use a window such as an 8×8 window. The window is an imaginary boundary that is placed around successive 8×8 sections of the error image 118. The number of white pixels in each 8×8 section (window) is counted. If the number of white pixels within the window is less than a threshold number, then the white pixels are considered random and are removed by making them black. Using a threshold value of 5 with an 8×8 window results in a justified error image 124 shown in FIG. 9. Since the left half of the error image 118 has only four white pixels, those pixels are considered scattered and are removed as illustrated by the left half of the justified error image 124. Alternative methods may be used to remove scattered pixels depending on the amount of scattering desired to be eliminated. One such method removes all white pixels that do not touch any other white pixels. Another method removes all white pixels that are not within a predetermined number of pixels from another white pixel.

In a preferred embodiment, the compressor 17 compresses the justified error image 124 in step 108 of FIG. 2B to reduce the number of bits required to encode the image. Numerous methods of data compression are known in the art such as Huffman encoding, Run-Length encoding, or Tiff-4 encoding. While any of these methods may be satisfactorily used, a simple method is to encode the image data solely as a sequence of flags and counts. For example, in the justified error image 124 of FIG. 8, the first 23 pixels when counting left-to-right and top-to-bottom are turned off. Instead of data, a single 8-bit byte may be used. One bit is used to signify that the pixels are turned off and seven bits may be used to encode the number 23. The pixels that are turned off are encoded as a bit signifying that the pixels are black together with a count of the number of black pixels. Once the justified error image is compressed in step 108, the compressed image and block counts are sent to a receiver 21 (FIG. 1)in step 110.

The receiver 21 is a device that portrays a halftone image, such as a printer or a monitor. The receiver produces a final output halftone image essentially by reversing the process that was used to create the compressed error image. The receiver includes a decompressor 23, an image controller 25, a differentiator 27, and an output system 29.

Figure 11:
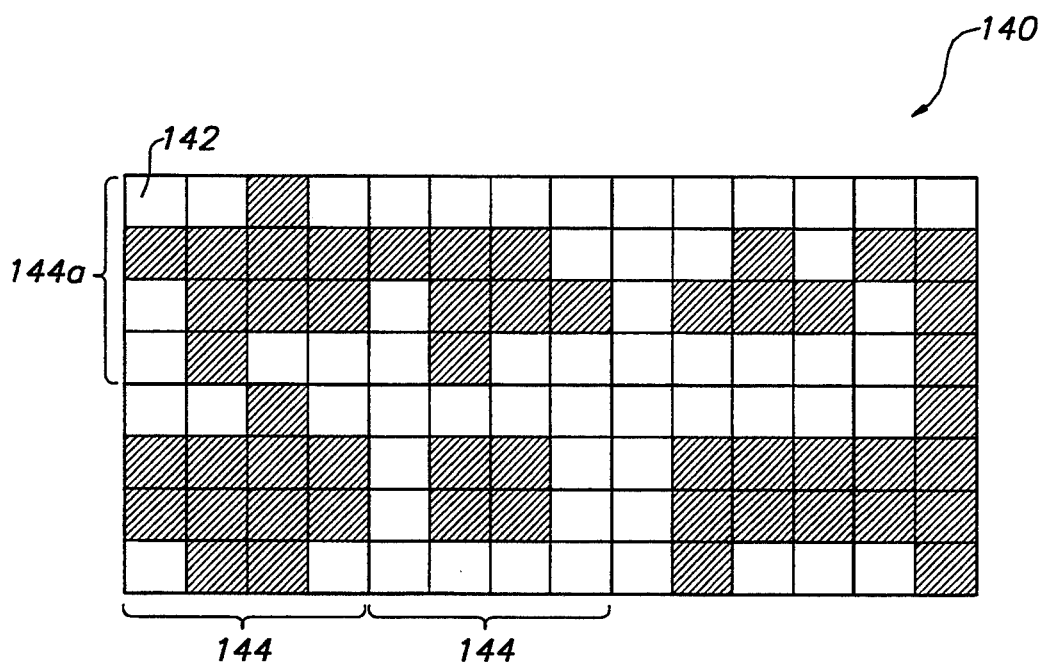
FIG. 11 is the output image resulting from the method shown in FIG. 10.
Figure 10:
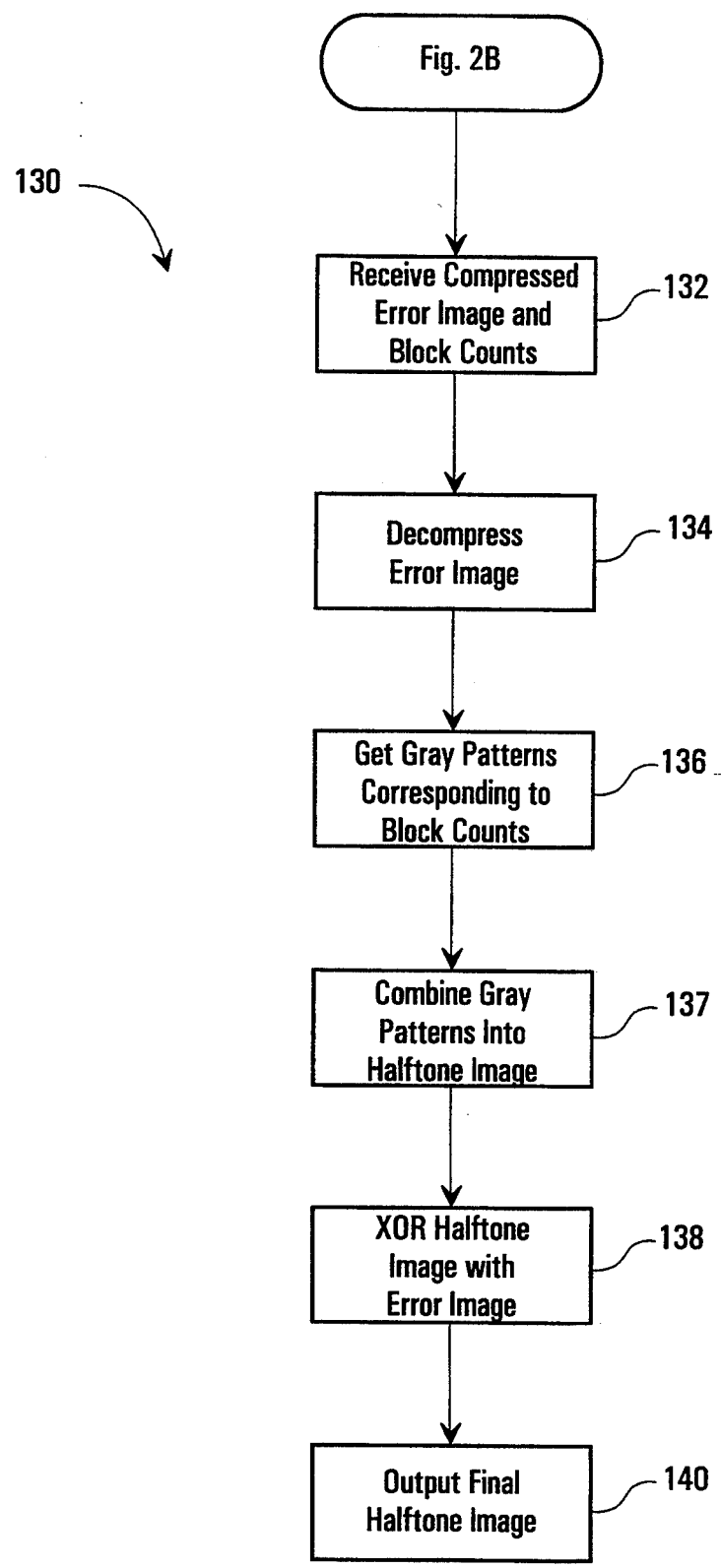
FIG. 10 is a flowchart of the method used by a receiver to convert the compressed error image into an output image according to the present invention.

FIG. 10 shows a flowchart 130 for a method used by the receiver 21 to create a final halftone image 140, illustrated in FIG. 11. The compressed error image and block counts are received in step 132. The decompressor 23 decompresses the error image using known techniques to get the justified error image 124 in step 134. Using the block counts that are received, the image controller 25 recreates the second halftone image 112 by combining the gray patterns corresponding to the block counts in step 137. The image controller 25 of the receiver 21 recreates the second halftone image using the same process used by the image controller 13 of the image processor 9 to create the second halftone image. The differentiator 27 exclusive-ORs the error image 124 with the second halftone image 112 to obtain the final halftone image 140 of FIG. 11. The output system 29 displays the final halftone image 140.

Exclusive-ORing is performed twice: once to create the error image 118 in step 104 and once to create the final output halftone image 140 in step 138. It will be appreciated that both exclusive-ORing steps may be replaced by exclusive-NORing steps. Using exclusive-NORing in step 104, the error image 118 will mostly consist of white pixels with some scattered black pixels that can be removed (i.e., turned white) by the same methods described above for removing scattered white pixels. When exclusive-NORing is done in step 138, the identical output image 140 is produced as was obtained by the exclusive-ORing steps described above.

It will be appreciated by those skilled in the art that the first and second halftone images 92, 112 and the error images 118, 124 are not necessarily displayed to a user. Those images are collections of bits in memory that are processed according to the method of the present invention shown in FIGS. 2A, 2B and 10. The bits may, and preferably are, processed without actually displaying the images.

In an alternate embodiment, the first and second halftone images 92, 112 and the error images 118, 124 are not even made. An array block 90a of the continuous-tone image 86 is transformed into a first halftone array block 96a and a second halftone array block 116a without subsequently combining the array blocks into the first and second halftone images 92, 112. The first halftone array block 96a is exclusive-ORed with the second halftone array block 116a to produce an error block 122a. Random pixels are removed from the error block 122a to obtain a justified error block 128a. The justified error block 128a is compressed and sent to the receiver 21 along with a block count for the second halftone array block 116a. The receiver 21 decompresses the justified error block 128a and recreates the second halftone array block 116a. The receiver exclusive-ORs the second halftone array block 116a with the justified error block 128a to produce a final halftone array block 144a. This process is repeated for each of the continuous tone array blocks 90, 91 to produce corresponding final halftone array blocks 144. The final halftone array blocks 144 are combined to form the final halftone image 140.

The system and method of the present invention allow a highly accurate halftone image to be output from the receiver without requiting a large amount of data to convey the image to the receiver. In most cases, the first and second halftone images will be substantially similar which results in an error image with very few pixels of one color. Such consistent pixels allow the data to be very highly compressed so that very few bits need to be conveyed to the receiver to obtain a high-quality output image.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A method of processing a continuous-tone image having one or more blocks of a plurality of pixels, each pixel being associated with a luminance value defining a brightness level of the pixel, comprising:
   a. performing threshold screening to transform a block of pixels of the continuous-tone image into a halftone block of pixels;
   b. determining a block count for the halftone block, the block count identifying the number of pixels of a predetermined first binary bit value in the halftone block;
   c. establishing a plurality of halftone gray pattern blocks of pixels;
   d. selecting a gray pattern block having the same number of pixels of the first binary bit value as are identified by the block count; and
   e. repeating steps a–d until gray pattern blocks have been selected for all blocks of the continuous-tone image.

2. The method of claim 1, further including creating error blocks by determining which pixels of the halftone blocks differ from corresponding pixels of the selected gray pattern blocks.

3. The method of claim 2, further including removing scattered pixels from the error blocks.

4. The method of claim 3 wherein the step of removing scattered pixels includes:

combining the error blocks into an error image;
counting the number of pixels having the first binary bit value in a section of the error image; and
changing the pixels with the first binary bit value in the section of the error image if the number of first binary bit value pixels in the section is less than a predetermined threshold value.

5. The method of claim 2 for use with a receiver, further including compressing the error block and sending the compressed error blocks and each block count to the receiver.

6. The method of claim 5 wherein the receiver decompresses the compressed error blocks, determines gray pattern blocks corresponding to the block counts and determines the differences between the gray pattern blocks and the error blocks to create final halftone array blocks.

7. The method of claim 6 wherein the receiver combines the final halftone array blocks into a final halftone image and displays the final halftone image.

8. The method of claim 1 wherein the threshold screening performed includes comparing the luminance value of a single pixel of the continuous-tone block with a single cell value of a threshold array.

9. The method of claim 2 wherein the error block is produced by exclusive-ORing the halftone block with the selected gray pattern block.

10. A method of processing a continuous-tone image having one or more blocks of a plurality of pixels, each pixel being associated with a luminance value defining a brightness level of the pixel, comprising:
   a. establishing a predetermined threshold array of cell values;
   b. comparing the luminance values of the pixels of a block of the continuous-tone image with the predetermined threshold array of cell values;
   c. determining a block count equal to the number of pixels of the block having luminance values that are greater than or equal to corresponding cell values in the threshold array;
   d. establishing a plurality of halftone gray pattern blocks of pixels;
   e. selecting a gray pattern block having the same number of pixels of the first binary bit value are identified by the block count;
   f. repeating steps a–e until all blocks of the continuous-tone image have been compared to the threshold array; and
   g. combining the selected gray pattern blocks into a halftone image.

11. The method of claim 10 for use with a receiver, further including compressing the halftone image and sending the compressed halftone image to the receiver.

12. The method of claim 11 wherein the receiver decompresses the compressed halftone image to obtain the halftone image.

13. A method of processing a continuous-tone image having one or more blocks of a plurality of pixels, each pixel having a luminance value defining a brightness level of the pixel, comprising:
   a. performing threshold screening to transform the block of pixels of the continuous-tone image into a first halftone block of pixels;
   b. determining a block count for the first halftone block, the block count identifying the number of pixels of a predetermined first binary bit value in the halftone block;

c. establishing a plurality of gray pattern blocks of pixels;

d. selecting a gray pattern block having the same number of pixels of the first binary bit value as are identified by to the block count;

e. processing all blocks of the continuous-tone image according to steps a–d above;

f. combining the first halftone blocks into a first halftone image;

g. combining the gray pattern blocks into a second halftone image; and h. creating an error image by determining which pixels of the first halftone image differ from corresponding pixels of the second halftone image.

14. The method of claim 13 for use with a receiver, further including compressing the error image and sending the compressed error image with the block count for each block of the second halftone image to said receiver.

15. The method of claim 14 wherein compressing the error image includes transforming the error image into a series of flags signifying whether pixels of the error image are of the first binary bit value, interspersed with run counts signifying numbers of consecutive pixels of identical binary bit values.

16. The method of claim 14 wherein the receiver decompresses the compressed error image, recreates the second halftone image from the block counts and creates a final halftone image equal to a difference between the error image and the second halftone image.

17. The method of claim 13 for use with a receiver, further including removing random pixels from the error image, compressing the error image, and sending the compressed error image with the block counts for each block of the second halftone image to said receiver.

18. The method of claim 17 wherein the random pixels are removed by employing a window of predetermined size, counting the number of pixels of a first color, making all pixels in the window a second color if the number of pixels of the first color is less than a predetermined threshold value.

19. The method of claim 17 wherein the receiver decompresses the compressed error image, recreates the second halftone image from the block counts, and creates an output image equal to a difference between the error image and the second halftone image.

20. The method of claim 13 wherein the error image is created by exclusive-ORing the first halftone image with the second halftone image.

21. The method of claim 13 wherein the threshold screening performed includes comparing the luminance value of a single pixel of the continuous-tone block with a single cell value of a threshold array.

22. A system for processing a continuous tone image having one or more blocks of a plurality of pixels, each pixel being associated with a luminance value defining a brightness level of the pixel, comprising:

a comparator adapted to perform threshold screening to transform blocks of pixels of the continuous tone image into halftone blocks of pixels, the comparator also being adapted to determine a block count for each halftone block, the block count identifying the number of pixels of a predetermined first binary bit value in the halftone block; and an image controller communicating with the comparator and obtaining one of a plurality of halftone gray pattern blocks having the same number of pixels of the first binary bit value as are identified by each block count.

23. The system of claim 22 further including a differentiator communicating with the image controller and the comparator, the differentiator producing error blocks by determining which pixels of the halftone blocks differ from corresponding pixels in the gray pattern blocks.

24. The system of claim 23 wherein the differentiator, the image controller and the comparator are parts of an image processor, the image processor further including a compressor compressing the error blocks; and the system further including a receiver communicating with the image processor to allow the compressed error blocks and each block count to be sent to said receiver.

25. The system of claim 24 wherein the receiver includes:

a decompressor decompressing the compressed error blocks;

a selector adapted to select each gray pattern block corresponding to each block count; and a receiver differentiator communicating with the decompressor and being adapted to determine which pixels of the gray pattern blocks differ from corresponding pixels of the error blocks to create final halftone array blocks.

26. The system of claim 25 wherein the receiver includes a receiver image controller communicating with said receiver differentiator, said receiver image controller combining the final halftone array block to form a final halftone image.

27. The system of claim 25 wherein the receiver includes an output system communicating with said receiver differentiator, the output system displaying the final halftone array blocks.

28. The system of claim 23, further including an error processor adapted to remove scattered pixels from the error block.

29. The system of claim 22 wherein the comparator performs the threshold screening by comparing the luminance value of a single pixel of the continuous tone block with a single cell value of a threshold array.

* * * * *

UNITED STATES PATENT AND TRADEMARK OFFICE
CERTIFICATE OF CORRECTION

PATENT NO. : 5,359,430
DATED : October 25, 1994
INVENTOR(S) : Shenzhi Zhang

It is certified that error appears in the above-identified patent and that said Letters Patent is hereby corrected as shown below:

In column 8, claim 5, line 9, please delete "block" and substitute therefor --blocks--.

In column 8, claim 10, line 45, after "value" and before "are", please insert --as--.

In column 10, claim 26, line 43, please delete "block" and substitute therefor --blocks--.

In column 10, claim 28, line 51, please delete "block" and substitute therefor --blocks--.

Signed and Sealed this

Third Day of January, 1995

*Attest:*

BRUCE LEHMAN

*Attesting Officer*     *Commissioner of Patents and Trademarks*